United States Patent Office 3,297,587
Patented Jan. 10, 1967

3,297,587
PROCESS FOR THE PREPARATION OF
CYANOPYRIDINES
Bernhard Scherhag, Leverkusen, Sigurd Hartung, Cologne-Mauenheim, Arnold Hausweiler, Cologne-Flittard, and Herbert Grünewald, Leverkusen, Germany, assignors to Farbenfabriken Bayer Aktiengesellschaft, Leverkusen, Germany, a German corporation
No Drawing. Filed Aug. 14, 1963, Ser. No. 301,951
Claims priority, application Germany Sept. 1, 1962,
F 37,726
7 Claims. (Cl. 252—432)

The present invention relates to a process for the preparation of cyanopyridines.

It is known that cyanopyridines can be prepared by the oxidation of alkyl-substituted pyridines in the presence of ammonia with molecular oxygen in the gaseous phase at elevated temperatures, using catalysts.

Cyanopyridines are, for example, valuable intermediate products in the preparation of nicotinic acid derivatives which are of great pharmaceutical importance.

In the processes hitherto proposed for the preparation of cyanopyridines such catalysts have been used which produce partial oxidation products, such as aldehydes and carboxylic acids from alkyl-substituted aromatic hydrocarbons at elevated temperatures by reaction with molecular oxygen in the gaseous phase. Although these catalysts also accelerate the oxidation of alkyl pyridines, they have only a slight effect on the simultaneous formation of nitriles when ammonia is present. One reason for this is that these catalysts oxidise a considerable portion of the ammonia supplied to the reaction to form molecular nitrogen and thereby remove the ammonia from the required reaction, and another reason is that these catalysts have no or very little chemisorption for ammonia. Therefore to obtain technically satisfactory results with these catalysts, the ammonia must be used in excess of the stoichiometrically required quantity. For example, in U.S. Patent 2,510,605 at least 2 mols of ammonia are required per alkyl group of the alkylpyridine which is to be converted to a nitrile. In U.S. Patents 2,592,123 and 2,839,535 it is also stated clearly that an excess of ammonia is required to obtain satisfactory yields.

Although satisfactory yields of cyano pyridine can be obtained by these methods, they do have the disadvantage of poor utilisation of the ammonia. To this is added the fact that the conditions of the process, which are determined by the explosion limits of alkyl pyridines and of ammonia, are very limited. For example, the explosion limits in air at 760 mm. Hg and 20° C. are between 1.80 volumes percent and 12 volumes percent for isomeric picolines, and between 15 volumes percent and 25 volumes percent for ammonia. If, therefore, 1.5 to 2 mols of ammonia are needed per mol of picoline, the reaction can only be carried out at the lower explosion limit, i.e. the picoline content must remain below 1.80%. Only a poor yield per unit of volume and time can therefore be obtained in the said processes.

It has now been found that cyanopyridines can be obtained in a particularly advantageous manner and with good yields per unit of volume and time by reacting alkyl-substituted pyridines with ammonia and molecular oxygen in the gaseous phase at elevated temperatures over catalysts if the catalysts used are made of so-called solid phosphoric acids which have been activated by the addition of compounds of the elements copper, iron, cobalt, nickel, bismuth, antimony, tin, vanadium, niobium, cerium, chromium, molybdenum and tungsten or mixtures of these compounds.

The process is particularly suitable for the preparation of cyanopyridines from the corresponding alkyl-substituted pyridines. For example, α-cyanopyridine is obtained from 2-methyl- or 2-ethylpyridine, nicotinic acid nitrile is obtained from 3-methyl or 3-ethylpyridine, and isonicotinic acid nitrile is obtained from 4-methyl or 4-ethylpyridine. In the same way, mono- or di-nitriles can be obtained from lutidines, and mono-, di- or tri-nitriles can be obtained from collidines. Imides can be formed from orthodialkyl pyridines.

The solid phosphoric acids used according to the invention are high molecular weight phosphoric acids. Mixtures or compounds of phosphoric acids with an adsorptive material or a reagent are used in which the phosphoric acids may be bound either physically or chemically, and all transitions between these two extremes are possible, the compounds being mechanically firm and hard substances under the reaction conditions. One important feature of all these so-called solid phosphoric acids is their marked acidity, which can be detected by the colour change from yellow to red in p-dimethyl-aminoazobenzene and from yellow to violet in phenylazodiphenylamine, corresponding to an acidity ($pK_a$) of 3.29 and 1.52 respectively (method of C. Walling, Journal of the American Chemical Society, vol. 72, page 1164 (1950)).

Lying at the extreme ends of a continuous series ranging from purely physical to purely chemical bonds, there may be mentioned the known phosphoric acid catalysts on carbon as examples of a purely adsorptive bond and boron phosphate as example of a pure chemical bond. The preparation of solid phosphoric acids is known generally and has been practised for a long time. These solid phosphoric acids are generally prepared, for example, by mixing or kneading a phosphoric acid in a highly concentrated form with dry and pulverulent adsorbent or reagent, and additives may be mixed with the dry powder or dissolved in the phosphoric acid to produce liquid or thickly viscous or doughy masses which are then subjected, in the form of pills or granules or as such, to a heat treatment with or without pressure so that firm hard masses are formed.

Examples of solid adsorption or reaction components are inorganic metal oxides and oxides of metal-like elements, particularly those of Groups 2 to 4 of the periodic system, such as silicic acid, aluminium oxide, magnesium-, thorium, titanium-, zirconium- and boron oxide or boric acid or compounds or mixtures of these substances with each other, e.g. silicon-aluminium oxides, silicon-zirconium oxides, silicon-titanium oxides, titanium-boron oxides, titanium-zirconium-boron oxides, or materials which have a predominantly siliceous character, such as diatomaceous earth, kieselguhr, synthetically produced porous silica gel or naturally occurring substances such as fuller's earth or Florida earth, clays such as bentonite, montmorillonite or other acid-treated clays.

It is preferable to use phosphoric acids in which the phosphorous is pentavalent. Very good results are generally obtained if the acids are added in such quantities that the end product contains, for example, 30 to 75% by weight of phosphoric acid calculated as $P_2O_5$, although smaller or larger quantities may also be used.

Thus good results are still obtained with contents of, for example, 20 to 30%, and in some cases useful results can still be obtained with contents of, for example, 10 to 20%. Quantities of, for example, 5% are still sufficient in some cases, although it is generally more advantageous to use higher phosphoric acid concentrations. The upper limit for the quantity of phosphoric acid used is determined by the requirement that a mechanically firm mass should be produced on forming and heat treatment. The maximum quantity of phosphoric acid that can be used thus depends on the particular adsorption or reaction components and can easily be determined by a few experiments. In general, both orthophosphoric acid and pyrophosphoric acid as well as more highly condensed phosphoric acids such as tri- and tetraphosphoric acid and other polyphosphoric acids produced by further splitting off of water are used. If desired, mixtures of these acids produced by removal of water from ortho- or pyrophosphoric acid or obtained by the addition of solid phosphorous pentoxide to ortho- or polyphosphoric acid, generally known in technology as polyphosphoric acid mixtures, may be used. Suitable for use as activating agents which can be added to the solid phosphoric acids are compounds of the elements copper, iron, cobalt, nickel, bismuth, antimony, tin, vanadium, niobium, cerium, chromium, molybdenum and tungsten. Although these additives may be added singly to the solid phosphoric acids, particularly good results are obtained by using a combination of two or more activators.

The said elements may be used, for example, as oxides or hydroxides or in the form of other compounds, e.g. compounds with phosphoric, boric or silicic acid or with other components of solid phosphoric acids.

The ratio between solid phosphoric acids and compounds or mixtures of compounds of the said elements may vary within wide limits in the catalysts used according to the invention. For example, good results can be obtained with a ratio of 100:1, although in some cases it is advantageous to use catalysts in which the ratio between solid phosphoric acids and activators is, for example, 3:1 to 1:1. It is generally preferable to use catalysts which contain 1–10% by weight of compounds of the said elements in addition to solid phosphoric acids.

The catalysts used according to the invention may be prepared by the process customarily used for the preparation of solid phosphoric acid catalysts, e.g. ortho-, pyro- or polyphosphoric acids or their mixtures can be mixed or kneaded with the solidifying adsorbent, and the highly viscous to liquid mass or crude catalyst, which may or may not be preformed, may be subjected to a heat treatment between, for example 80° and 600° C.

This heat treatment is generally carried out in two stages, the substance being formed into shape at a relatively low temperature in the region, for example, of 80 to 300° C. by partial or complete reaction with the solid absorbent or reagent, usually with a marked exothermic reaction, the subsequent heat treatment at temperatures up to, for example 600° C., which may be longer in duration, imparting the necessary mechanical strength to the catalyst. The choice of optimum temperatures and times for the forming or shaping process differs for the different compositions of adsorption or reaction components with the corresponding phosphoric acids and can easily be determined.

If desired, the completely formed solid phosphoric acids can be mixed or impregnated with the additives according to the invention, e.g. in aqueous solution or suspension, prior to the heat treatment process and may then be heat treated, in some cases after first drying them.

The reaction according to the invention of alkylpyridines with ammonia and molecular oxygen at elevated temperatures over solid phosphoric acid catalysts can be carried out in a solid or fluidised bed, in which the catalysts only reach their highest activity after a certain initial period. The reaction is generally carried out at normal pressure, although elevated or reduced pressures can be employed.

The oxygen required for the reaction is advantageously supplied in the form of air, although it may also be supplied as pure oxygen or with inert gases such as carbon dioxide. The molar ratio of oxygen to alkyl pyridine depends on the number of alkyl groups that are to be substituted. Good results are obtained if the stoichiometric ratio of 1.5 mol of oxygen per methyl or methylene group is used in each case. However, the proportion can be varied within wide limits and depends, among other things, on the explosion limits at the particular reaction conditions. Good results are generally obtained with ratios of 0.5:1 to 20:1 of oxygen to alkyl pyridine.

The alkyl-substituted pyridines can be used in pure form or as mixtures with each other. The molar ratio of ammonia to alkylpyridine depends on the number of alkyl side groups which are to be carried over into the nitrile. One mol of ammonia should generally be used for each alkyl group. An excess of ammonia is not necessary, and good results are still obtained with a molar deficiency of ammonia. Depending on the reaction conditions, which must in all cases observe the explosion limits, good results are obtained with 0.5 to 1.5 mols of ammonia per alkyl group.

It has been found advantageous if the gas mixture composed of alkyl-substituted pyridines, ammonia, oxygen and, in some cases, inert gases is diluted with steam before it enters the reaction zone. This addition of steam is not absolutely necessary but invariably increases the yield. 0.5 to 10 mols of steam are generally used for 1 mol of alkylpyridine, although other ratios may be employed.

The reaction temperature for the conversion of alkyl-substituted pyridines with ammonia and molecular oxygen to cyanopyridines on solid phosphoric acid catalysts generally lies in the region of 300 to 700° C., preferably between 400 and 550° C. Apparent contact times of 0.1 to 30 seconds are generally sufficient, apparent contact times of 0.5 to 10 seconds being preferred. The apparent contact time is defined as the time during which a unit of volume of gas mixture, measured under the conditions of pressure and temperature of the catalyst bed, is in contact with a unit of volume of catalyst bed.

Compared with the processes hitherto known, the process according to the invention makes it possible to obtain alkyl-substituted pyridines in good yields, calculated on the alkylpyridine and on ammonia, and in good yields per unit of volume and time without the use of any significant excess of ammonia. This invention will be explained in the following examples.

*Example 1*

79 parts by weight of ammonium heptamolybdate are dissolved in 2100 parts by weight of 85% orthophosphoric acid, which contains 85% of orthophosphoric acid and 15% of water with heating. 1050 parts by weight of boric acid and 157 parts by weight of bismuth nitrate $Bi(NO_3)_3 \cdot 5H_2O$, dissolved in 150 parts by weight of 10% $HNO_3$, are introduced into this solution with stirring. The mixture is stirred or kneaded at 150–180° C. until a viscous paste is formed. This paste is spread on a sheet and formed to a solid mass at 180° C. The mass is then granulated to a grain size of 0.15 to 0.40 mm. and heated for 4 hours at 500° C.

In a fluidised bed furnace heated to 450° C., a gas mixture preheated to 300° C. and consisting of 4 parts by volume of γ-picoline, 40 parts by volume of air, 4 parts by volume of ammonia and 40 parts by volume of steam is passed at such a rate over this catalyst that the apparent contact time is 1.6 seconds. 83% of the γ-picoline originally added is converted. Calculated on the converted γ-picoline, 88% of isonicotinic acid nitrile, 9% of combustion products and 3% of pyridine are obtained.

*Example 2*

68 parts by weight of molybdic acid (85% $MoO_3$) are heated for about 16 hours under reflux with 2.33 parts by weight of 85% orthophosphoric acid in 100 parts by weight of water. 10 parts by weight of concentrated $HNO_3$ and 147 parts by weight of $Bi(NO_3)_3 \cdot 5H_2O$ are then added and dissolved until clear by heating. This solution is mixed with 1000 parts by weight of titanium dioxyhydrate and 2000 parts by weight of technical polyphosphoric acid. This mass is solidified in 6 hours at 180° C., granulated to a grain size of 150 to 400μ and heated for 16 hours at 550° C.

A gas mixture preheated to 350° C. and composed of 18 litres of γ-picoline, 18 litres of ammonia, 150 litres of air and 150 litres of steam are passed hourly over 600 ml. of catalyst in a fluidised bed furnace heated to 465° C. 68% of the γ-picoline originally added is used up. Calculated on the quantity of γ-picoline used up, 84% of isonicotinic acid nitrile (5% pyridine and 11% combustion products) are obtained.

Example 3

The following solution was prepared three times.

3.16 parts by weight of 85% orthophosphoric acid are heated under reflux with 54.4 parts by weight of molybdic acid (85% $MoO_3$) in 600 parts by weight of water for about 16 hours until dissolved. 90 parts by weight of concentrated $HNO_3$ and 117.6 parts by weight of $Bi(NO_3)_3.5H_2O$ are then added.

The following are impregnated under the same conditions with this solution:

(a) 2000 parts by weight of an aluminium oxide of grain size 0.15 to 0.44 mm., previously heated in a muffle for 22 hours at 1100° C.

(b) 2000 parts by weight of a silica gel of the same grain size and an internal surface of less than 500 m.²/g.

(c) 2000 parts by weight of a boron phosphate of grain size 150 to 400μ, the granules having been formed at 180° C.

All three catalysts were heated for 4 hours at 500° C. after the activator solution had dried up. They were then tested side by side under the same operating conditions as in Example 1, in the same fluidised bed furnace and for the same length of time. The following results were obtained.

| Catalyst | γ-Picoline conversion | γ-Cyano-pyridine yield | Combustion $CO_2+CO+HCN$ |
| --- | --- | --- | --- |
|  | Percent | Percent | Percent |
| (a)=$Al_2O_3$ | 55 | 7 | 50 |
| (b)=$SiO_2$ | 21 | 18 | 50 |
| (c)=$BPO_4$ | 81 | 79 | 10 |

The catalyst (c) according to the invention clearly shows the advantage of solid phosphoric acids compared with an inert carrier.

Example 4

85 parts by weight of ammonium heptamolybdate are dissolved in 2100 parts by weight of 85% orthophosphoric acid with heating. 1050 parts by weight of boric acid and 233 parts by weight of cobalt nitrate $Co(NO_3)_2 \cdot 6H_2O$ dissolved in 150 parts by weight of water are introduced into this solution with stirring. The mixture is then stirred or kneaded at 150 to 180° C. until a highly viscous paste is formed. This paste is spread on to sheets and formed into a solid mass at 180° C. The mass is then converted into granules of grain size 0.15 to 0.40 mm. and heated for 4 hours at 500° C. A gas mixture preheated to 300° C. and composed of 4 parts by volume of γ-picoline, 4 parts by volume of ammonia, 30 parts by volume of air and 30 parts by volume of steam is then passed at such a rate over this catalyst in a fluidised bed furnace heated to 450° C. that the apparent contact time is 2.1 seconds. 86% of the γ-picoline originally added is used up. Calculated on the amount of γ-picoline used up, 82% of isonicotinic acid nitrile, 19% of combustion products and 7% of pyridine are obtained.

Example 5

79 parts by weight of ammonium heptamolybdate are dissolved in 2100 parts by weight of 85% orthophosphoric acid with heating. 1050 parts by weight of boric acid and 78.5 parts by weight of $Bi(NO_3)_3 \cdot 5H_2O$ and 65.6 parts by weight of $Fe(NO_3)_3 \cdot 9H_2O$ dissolved in 150 parts by weight of 10% $HNO_3$ are introduced into this solution with stirring. The substance is solidified to form a granular catalyst of grain size 0.15 to 0.40 mm. as described in Example 1.

A gas mixture preheated to 300° C. and composed of 4 parts by volume of γ-picoline, 4 parts by volume of ammonia, 28 parts by volume of air and 30 parts by volume of steam is passed over this catalyst in a fluidised bed surface heated to 445°, the contact time being 1.4 seconds. 88% of the picoline added is used up. Calculated on the amount of γ-picoline used up, 78% of isonicotinic acid nitrile, 14% of combustion products and 8% of pyridine are obtained.

Example 6

79 parts by weight of ammonium heptamolybdate are dissolved in 2100 parts by weight of 85% orthophosphoric acid with heating. 1050 parts by weight of boric acid and 157 parts by weight of bismuth nitrate pentahydrate in form of a 10% nitric acid solution are introduced into this solution with stirring. After stirring the mixture until homogeneous, a weak hydrochloric solution of 5.3 parts by weight of ammonium vanadate in 50 parts by weight of water is added. Stirring is continued and the mixture is converted into a granulated fluidised bed catalyst as described in Example 4.

A gas mixture preheated to 260° C. and consisting of 4 parts by volume of α-picoline, 4 parts by volume of ammonia, 30 parts by volume of air and 30 parts by volume of steam is then passed at such a rate over this catalyst in a fluidised bed reactor heated to 455° C. that the apparent contact time is 1.6 seconds.

92% of the α-picoline are reacted. Calculated on the amount of α-picoline used up 60% of α-cyanopyridine, 28% of pyridine and 12% of combustion products are obtained.

Example 7

50 parts by weight of copper nitrate $Cu(NO_3)_2 \cdot 3H_2O$ and 24 parts by weight of ammonium molybdate are added to 1330 parts by weight of 85% orthophosphoric acid. This mixture is added to 620 parts by weight of boric acid and 114 parts by weight of zirconium dioxide.

The mass is dried at 150° C., comminuted and heated at 500° C. for 4 to 6 hours.

A gas mixture preheated to 300° C. and consisting of 1 part by volume of β-picoline, 1 part by volume of ammonia, 7.5 parts by volume of air is passed over this catalyst in a fluidised bed reactor heated to 485° C. at such a rate that the apparent contact time is 1.75 seconds. 82% of the β-picoline used are reacted. Calculated on the amount of β-picoline used up 72% of nicotinic acid nitrile, 12% of pyridine and 16% of combustion products are obtained.

We claim:

1. A catalyst for producing cyanopyridines from alkylated pyridines with oxygen and ammonia consisting of a mixture of
    (a) a phosphoric acid in an amount at least about 5% by weight based on the mixture, calculated as $P_2O_5$,
    (b) a compound selected from the group consisting of boric acid, titanium dioxyhydrate and zirconium dioxide, and mixtures thereof, and
    (c) a compound of a heavy metal selected from the group consisting of copper, iron, cobalt, nickel, bismuth, antimony, vanadium, niobium, cerium, chromium, molybdenum and tungsten and mixtures thereof,
    said mixture having been solidified by heating.

2. A catalyst according to claim 1, wherein said mixture consists of orthophosphoric acid, boric acid, ammonium heptamolybdate and bismuth nitrate.

3. A catalyst according to claim 1, wherein said mixture consists of polyphosphoric acid, titanium dioxyhydrate, molybdic acid and bismuth nitrate.

4. A catalyst according to claim 1, wherein said mixture consists of orthophosphoric acid, boric acid, ammonium heptamolybdate and cobalt nitrate.

5. A catalyst according to claim 1, wherein said mixture consists of orthophosphoric acid, boric acid, ammonium heptamolybdate, bismuth nitrate and ferric nitrate.

6. A catalyst according to claim 1, wherein said mixture consists of orthophosphoric acid, boric acid, ammonium heptamolybdate, bismuth nitrate and ammonium vanadate.

7. A catalyst according to claim 1, wherein said mixture consists of orthophosphoric acid, boric acid, zirconium dioxide, ammonium heptamolybdate and copper nitrate.

References Cited by the Examiner

UNITED STATES PATENTS

| | | | |
|---|---|---|---|
| 2,002,997 | 5/1935 | Herold et al. | 252—438 X |
| 2,112,387 | 3/1938 | Sweeney et al. | 252—432 X |
| 2,282,602 | 5/1942 | Drennan | 252—435 X |
| 2,525,145 | 10/1950 | Mavity | 252—432 |
| 2,650,201 | 10/1953 | Mavity | 252—435 |
| 2,783,266 | 2/1957 | Toland | 260—294.9 |
| 2,861,999 | 11/1958 | D'Alessandro | 260—294.9 |

MILTON WEISSMAN, *Primary Examiner.*

WALTER A. MODANCE, OSCAR R. VERTIZ,
*Examiners.*

A. L. ROTMAN, H. S. MILLER, *Assistant Examiners.*